Sept. 27, 1932.   H. W. EAKINS   1,879,928
MACHINE AND METHOD FOR MAKING POP CORN CONFECTIONS
Filed May 4, 1931   2 Sheets-Sheet 2
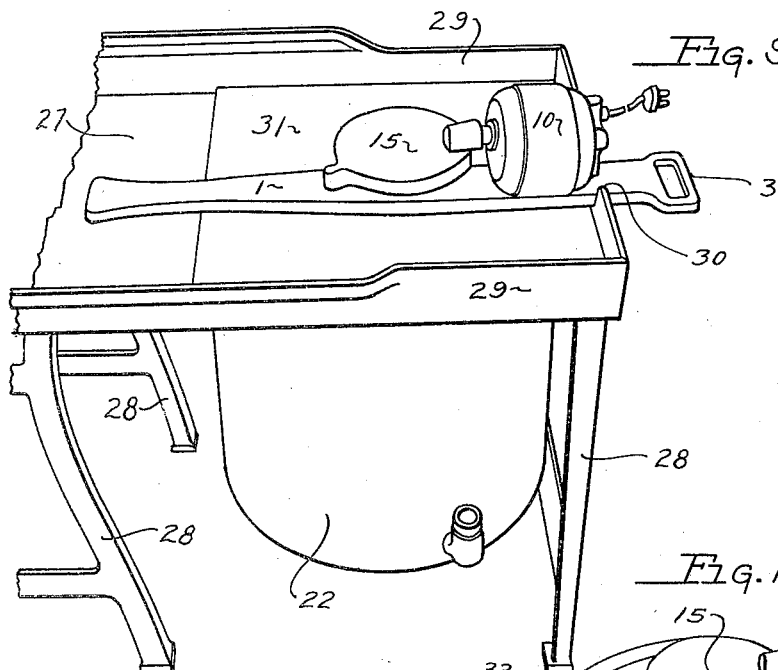
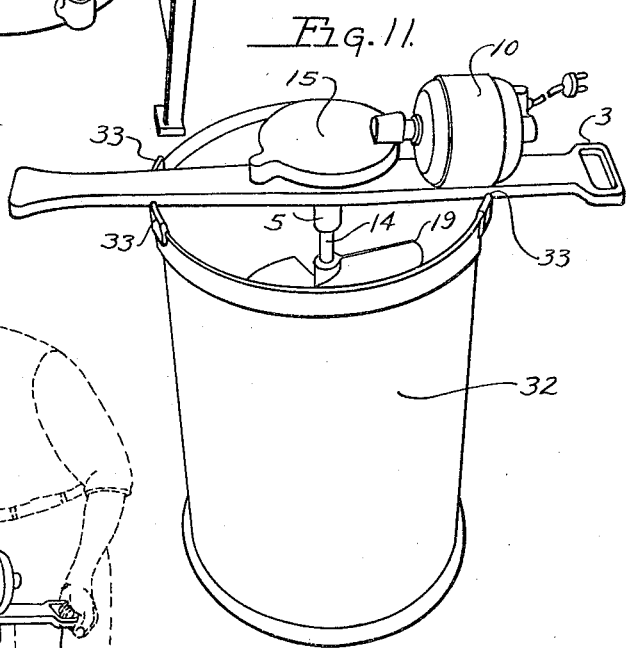
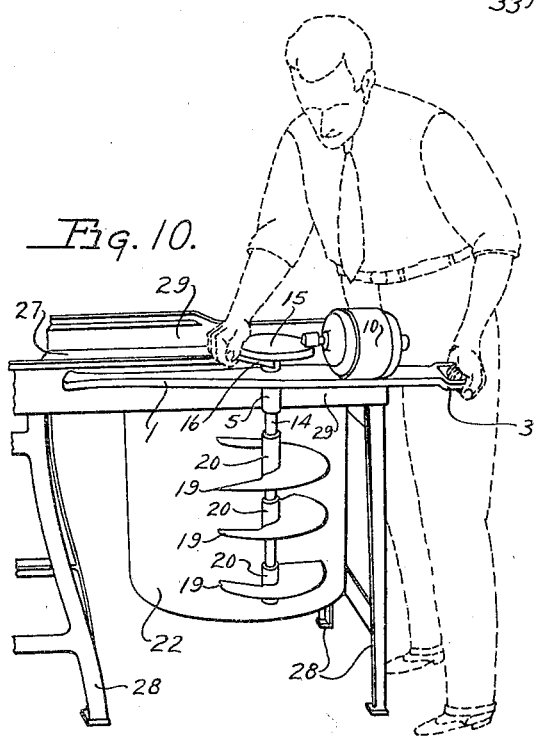
INVENTOR
Herbert W. Eakins
BY
Toulmin & Toulmin
ATTORNEYS Patented Sept. 27, 1932

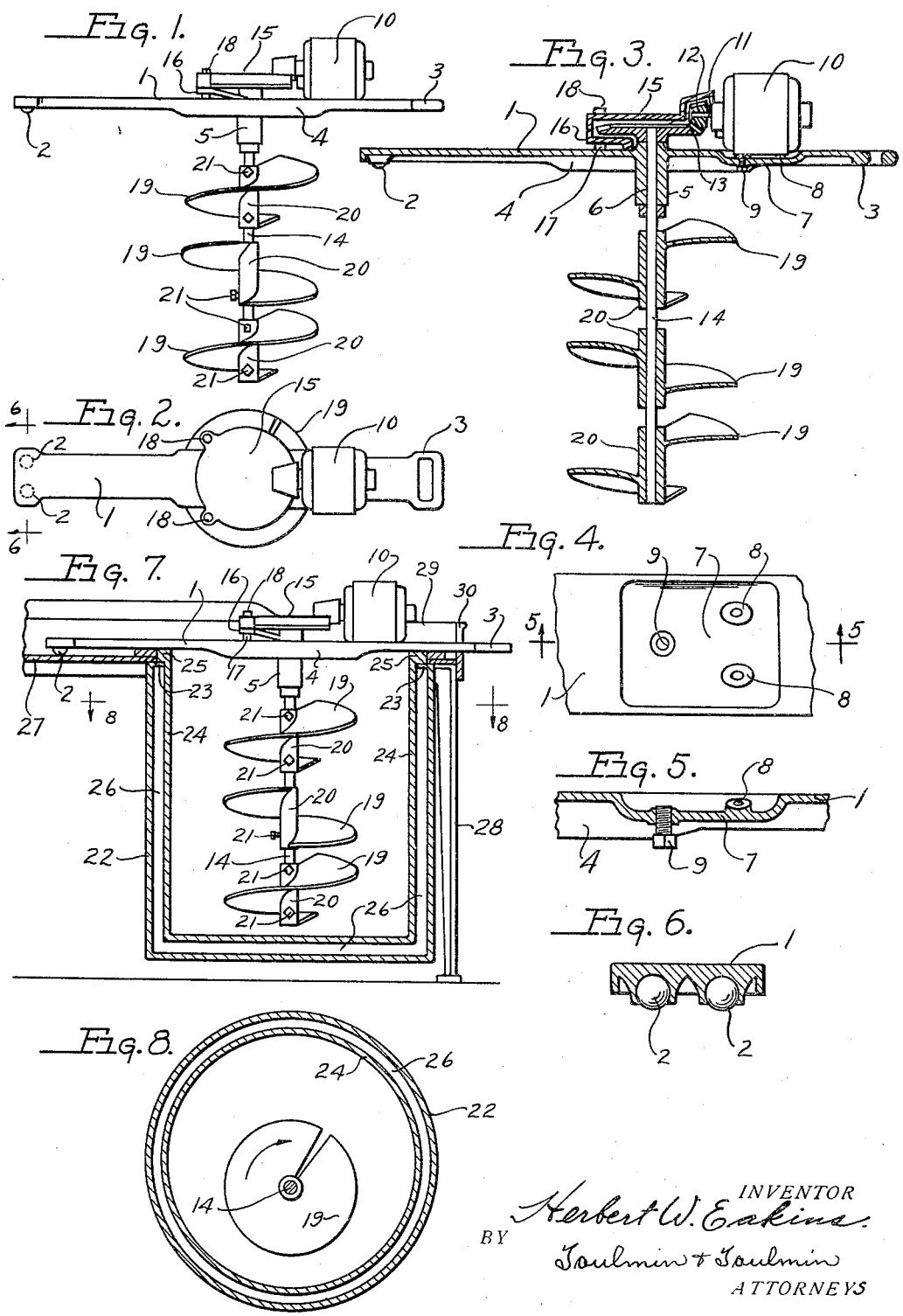

1,879,928

UNITED STATES PATENT OFFICE

HERBERT W. EAKINS, OF SPRINGFIELD, OHIO

MACHINE AND METHOD FOR MAKING POP CORN CONFECTIONS

Application filed May 4, 1931. Serial No. 534,876.

This invention relates to an apparatus for heating, mixing and stirring popcorn and syrup, and has for its object to provide means for thoroughly mixing and stirring the syrup and popcorn.

It is an object of this invention to provide a mixer supported on a unitary base, which has mounted thereon suitable power and stirring and mixing means.

It is particularly the object of this invention to provide a portable stirrer consisting of a plate which has mounted thereon a motor and a rotating stirrer operated by the motor.

It is also an object of this invention to provide in connection with a stirrer, a water tank in which the spiral blades of the mixer can be inserted in order that all the candy may be cleaned from the spiral blades.

Other objects and advantages will be apparent from the following description taken in connection with the drawings, in which there is shown a preferred embodiment of this invention.

Referring to the drawings:

Figure 1 is a side elevation of the stirring apparatus.

Figure 2 is a top plan view of the apparatus shown in Figure 1.

Figure 3 is a vertical section.

Figure 4 is a top plan view of part of the base plate showing the depression in which the motor is located.

Figure 5 is a section on the line 5—5 of Figure 4.

Figure 6 is a section on the line 6—6 of Figure 2.

Figure 7 is a sectional view of a container with the stirring apparatus mounted thereon.

Figure 8 is a section on the line 8—8 of Figure 7.

Figure 9 is a perspective view showing a section of a top of a table supporting a container in which applicant's stirrer is inserted.

Figure 10 is a view showing the manner of holding the stirrer for movement about in the container. The operator with one hand will grip the casing enclosing the operating gear and with the other hand will grip the handle 3. With the parts thus gripped, the stirrer and the blades thereon may be shifted to any point within the container for thoroughly mixing and stirring the contents of the container.

Figure 11 is a view showing a water tank, into which the blades are inserted after the corn and syrup have been removed from the blades.

In Figure 1 there is shown a mixing and stirring apparatus adapted to be used with various forms of containers and for mixing different materials. The main part of this apparatus consists of a base plate 1, relatively long in comparison with its width. This plate has at one end ball bearings 2, and at the other end a handle 3. By this means the plate may be easily supported on a table or some other suitable support and rolled over the top thereof. Near the center of the base plate, between the handle and the ball bearings, is a central enlargement 4 which has extending downwardly therefrom in its center a boss 5, with a hole 6 therein.

Between the boss 5 and the handle 3 is a depression 7 adapted to form a seat for a motor. This depression is rectangular in shape and has in one end two pads 8. These pads may be formed of any suitable material, such as fiber, rubber or felt. In the other end of the depression is a screw 9 for engaging the under side of the motor casing 10 for adjusting purposes, the other end of the motor resting upon the pads 8. The motor has the usual shaft 11 which has on one end a pinion 12 engaging a gear 13. The gear 13 is located on the upper end of a shaft 14, which extends through the hole 6 in the boss 5.

Inclosing the pinion 12 and the gear 13 is a casing 15, which is supported on the base plate 1 by means of a bracket 16. The bracket 16 is fastened to the base plate by means of screws 17, while the casing is fastened to the bracket 16 by means of screws 18. By means of this housing the gear mechanism is protected from dirt, dust, grit and other foreign matter. On the shaft 14 is a plurality of blades 19. Each blade 19 has a hub 20 with an opening therein to receive the shaft 14, and is held on the shaft by means of screws 21.

From an examination of Figure 1 it will be noticed that the blade is spiral in shape and extends approximately around the shaft. These blades are so arranged and spaced that when the shaft rotates the material being stirred or mixed is moved upwardly from the bottom of the container toward the top, each blade bringing the material stirred to the vicinity of the next adjacent higher blade. By this means there is a continuous upward travel of the material being mixed along the shaft and down along the edge of the container.

By means of the ball bearings 2 and the handle 3 the position of the blades may be shifted in the container. In Figure 8 the blades are shown nearer one side of the container than the other. The blades may be moved adjacent any side or be held in the middle of the container. By this means the contents of the container are thoroughly mixed and agitated.

It will be noticed from an examination of Figure 7 that the container disclosed here is a double wall container or a container within a container. The outer container is indicated by the numeral 22, and has on its upper edges inwardly directed flanges 23. The inner container is indicated by the numeral 24 and has outwardly directed flanges 25 adapted to engage and rest upon the flanges 23. These two containers or receptacles may be joined together by welding the flanges 23 to the flanges 25 so that these become a unitary container with an intervening water space 26.

While this stirrer may be used in connection with various kinds of receptacles or containers, there is shown in Figures 7, 8, 9 and 10 a double walled container in which the walls are spaced apart to provide water space so that there may be an even and equal distribution of heat through and around the container. When in use, the container is supported on a table 27, which has legs 28 for supporting the table. Around two sides of the table are flanges 29, which extend partly across one end of the table without meeting to provide a space 30 in which the end of the plate 1 may be inserted when the stirrer is applied to the confection within the container 22, supported on the table in the manner shown in Figure 9.

In Figure 9, the opening in the table, through which the container is inserted, is covered by means of a plate or cover 31. After the confection has been thoroughly mixed and removed from the blades, the stirrer is removed from the table and placed over a bucket or container 32 with the blades immersed in water in the container 32. For properly holding the stirrer on the upper edges of the container 32, there are lugs 33 provided—two pairs, one on each of opposite sides of the container for preventing the movement of the stirrer plate 1 on the container when the blades are on the water or other liquid within the container.

In Figure 10, the manner of holding the stirrer is illustrated. As shown in this figure, the operator will grip the handle 3 by his left hand and will grip the casing in which the gears are enclosed with the right hand. With the stirrer thus gripped, the plate 1 may be shifted about over the container 22, so that blades 19 may assume any position within the container for thoroughly stirring and mixing the contents of the container.

I desire to comprehend within my invention such modifications as may be embraced within my claims and the scope of my invention.

Having thus fully described my invention, what I claim as new and desire to secure by Letters Patent, is:

1. In a stirrer, a portable base plate having on its under surface at one end ball bearings, on the other end a handle, near its center a boss with a hole therein, and adjacent the boss a depression forming a motor seat, means in the seat to adjust the motor, a motor in said seat, said motor having a shaft with a pinion thereon, a shaft in said hole, a gear on said shaft in mesh with said pinion, and a plurality of spiral stirring blades on said last-named shaft.

2. In a stirrer, a portable base plate having on its under surface ball bearings, on one edge a handle, near its center a boss with a hole therein, and adjacent the boss depression forming a motor seat, a pair of pads and a screw in the seat, a motor in said seat on the pads and the screw and adapted to be adjusted by the screw, said motor having a shaft with a pinion thereon, a shaft in said hole, a gear on said shaft in mesh with said pinion, and a plurality of adjustable spiral stirring blades on said last-named shaft.

3. In a stirrer, a base plate having on its under surface ball bearings, on one edge a handle for moving the plate about on the bearings, a boss with a hole therein on the under surface, a bracket adjacent the boss, and a depression forming a motor seat in its upper surface, a motor in said seat, said motor having a shaft with a pinion thereon, a stirrer shaft in said hole, a gear on said stirrer shaft in mesh with said pinion, and a casing inclosing the pinion and the gear removably mounted on said base bracket.

In testimony whereof, I affix my signature.

HERBERT W. EAKINS.